United States Patent Office 2,698,312
Patented Dec. 28, 1954

2,698,312

CATECHOLS CONTAINING A SUBSTITUENT IN THE 4-POSITION AS GELATION INHIBITORS IN POLYESTER MIXTURES

Earl E. Parker, Milwaukee, Wis., assignor to Pittsburgh Plate Glass Company, Allegheny County, Pa., a corporation of Pennsylvania No Drawing. Application May 22, 1951,
Serial No. 227,755

12 Claims. (Cl. 260—45.4)

The present invention relates to stabilization of polymerizable unsaturated alkyd resins, particularly polyesters of dihydric or other polyhydric alcohol esters of polycarboxylic acids which contain a polymerizable ethylenically unsaturated group, preferably in the alpha beta position and to stable compositions comprising such esters.

An object of the invention is to provide a polymerizable material comprising a polyester of a dihydric alcohol and an ethylenically unsaturated alpha beta dicarboxylic acid or a mixture of such polyester and polymerizable, ethylenically unsaturated compound which is adapted to polymerize, which material is characterized by some, and preferably all, of the following characteristics:

1. In uncatalyzed state, it can be stored for a relatively long period of time.
2. After incorporation of a catalyst, it still can be stored for substantial periods of time, e. g., a day or more at temperatures of about 77 to 100° F. or even somewhat higher without gelling.
3. It will cure rapidly and efficiently when it is catalyzed and heated to proper temperature.
4. It will withstand storage in the catalyzed or uncatalyzed state with a minimum of change or drift in the curing rate.
5. It does not undergo appreciable discoloration during curing or upon aging. The curing rate is not subject to progressive retardation during periods of storage of one to two days after the addition of peroxide catalyst.

It has heretofore been recognized that polymerizable unsaturated alkyd resins, especially polyesters of dihydric alcohols and polycarboxylic acids comprising an ethylenically unsaturated dicarboxylic acid in which the carboxylic groups are linked to one or both of the ethylenic carbon atoms, are capable of polymerization by addition reaction between the ethylenic groups of the polyester to form thermoset products.

It has also been suggested to admix liquid, or at least fusible linear polyesters with polymerizable ethylenically unsaturated compounds often termed "monomers" and to copolymerize the two by heating the mixture in the presence of a peroxide catalyst. This reaction has been extensively elaborated upon in patents such as U. S. Patents 2,409,633 and 2,443,735 to 2,443,741 inclusive, granted to Kropa or U. S. Letters Patent 2,450,552 granted to Hurdis, as well as in numerous other patents and publications. Typical examples of publications are to be found in Industrial and Engineering Chemistry, December 1939, page 1512, and January 1940, page 64.

The foregoing polymerizable compositions undergo addition reaction, that is, reaction at the points of carbon-carbon unsaturation, even at room temperature or thereabouts. This is especially true in the case of copolymerizable mixtures of the polyesters and the ethylenically, or vinylically unsaturated compounds. A polyester of maleic or fumaric acid and a glycol such as propylene glycol or diethylene glycol, in the presence of a vinylic monomer such as styrene, unless inhibited, will begin to gel almost at once. In normal operations, it is customary to promote the final cure of the material by adding a small amount, e. g., 0.05 to 5% or thereabouts, of a catalyst of addition reaction such as benzoyl peroxide, tertiary butyl hydroperoxide and other organic peroxides not specifically a feature of this invention. These catalysts are usually added shortly before the resins are to be cured. Ordinary mixtures containing them will gel very rapidly even at temperatures below the normal curing range.

This strong tendency of the copolymerizable mixtures to set prematurely was early recognized (see Ellis Patent 2,255,313). In that patent, it is proposed to improve this property by incorporating α cellulose as a filler. This, of course, greatly restricts the field of application of the mixtures, since the patented process can be applied only to filled composition.

It has been proposed, for purposes of reducing this tendency of the polymerizable mixtures to gel prematurely during storage and for purposes of assuring reasonable stability after addition of curing catalyst, to add small amounts of organic compounds termed stabilizers that would retard gelation. Many compounds have been so tested. Among these are conventional phenols containing a plurality of hydroxyls. Hydroquinone and tertiary butyl catechol constitute more common members of this class. For some applications, e. g., in the laminating art, they have been accepted as gelation inhibitors, in the absence of better inhibitors, because they do retard gelation in storage. However, they may retard the rate of cure, produce "drift," tend to discolor the resins, produce pitting and ghosting and in the case of more massive castings, they may produce cracking of the finished products. Therefore their field of usefulness is limited.

Accordingly, there has been an extensive search for a gelation inhibitor for mixtures comprising polyesters of dihydric alcohols and ethylenically unsaturated alpha beta dicarboxylic acids which would:

(1) Successfully prevent gelling of an uncatalyzed mixture during reasonably long periods of storage in the uncatalyzed state;

(2) Be effective for a number of hours or even a day or two after addition of peroxide catalysts and at temperatures of 100° F. or even somewhat above;

(3) Have but little effect upon the final cure of the mixtures;

(4) Not cause objectionable change or "drift" in the curing characteristics of the mixture during storage; and (5) Would not affect the color of the finished products.

It has now been discovered that catechols which are substituted by a normal alkyl hydrocarbon group in the 4-position meet all of the foregoing requirements unusually satisfactorily. They can be successfully incorporated in small stabilizing amounts with a polymerizable unsaturated alkyd resin such as a polymerizable polyester of ethylenically unsaturated alpha beta dicarboxylic acids and dihydric alcohols or with mixtures of such polyesters and polymerizable ethylenically unsaturated compounds to provide mixtures that are unusually stable both before and after addition of peroxide catalysts of addition reaction. The mixtures are also exceptionally constant in curing characteristics during normal periods of storage. Yet these mixtures cure quite readily when properly heated to form hard, resinous bodies of good color.

Resinifiable mixtures inhibited with hydroquinones, tertiary butyl catechol, quinone or tetrachloroquinone show a large upward drift in curing time. This means that the catalyzed resin requires a longer time to cure after aging than it does when freshly prepared. This forces an operator running a laminating machine or other equipment employed to cure the mixtures to resinous form to re-adjust the time cycle of operations frequently in order that a properly cured product may be obtained. In some cases it may even be impractical to employ the copolymerizable mixtures because of the sharp variations in the curing time thereof. The ideal inhibitor would permit a substantially constant rate of cure in the polymerizable material over a long period of time. The 4-alkyl substituted catechols in which the alkyl chain is free from branching are singularly effective in this regard. Such change or drift in curing time as may occur in mixtures containing them is usually toward a lowering of the curing time. This is not particularly objectionable, since it can never result in undercuring of the product. Unnecessarily prolonged heating is not desirable from the standpoint of economy, but within reason, it does not degrade the product.

Obviously compounds that impart color to the resin products are also undesirable as inhibitors. The quinones, for example, color the resin both before and after cure. Some of the inhibitors react in the presence of peroxide catalysts to produce colored material of varying stability during cure of the resin. Catechol, for example, produces a brown color that does not completely fade during the cure. Many of the substituted catechols produce colors, varying from pale yellow to pink, that are almost completely destroyed when the resin is cured and are therefore satisfactory from the viewpoint of discoloration.

It is obviously desirable that the time of cure of the copolymerizable mixture be as short as possible but that the storage life of the catalyzed mixture be as long as possible. The 4 normal alkyl substituted catechols have now been found to be superior to any of the conventional phenolic compounds tested in this respect. Mixtures containing them as inhibitors cure within a relatively short time and simultaneously a long tank life is attained.

It is further desirable that the copolymerizable mixtures should be storable over long periods of time without substantial change in the curing characteristics thereof. Many inhibitors of gelation, especially the quinones, are subject to destruction in the copolymerizable mixture during a period of storage and there is a fairly rapid change in the properties of the resin in which they are used for storage at room temperatures. Numerous tests clearly show that the catechols containing a normal aliphatic hydrocarbon group in the 4-position are usually satisfactory and reliable in this respect.

Other dihydric phenols including some catechols have a stabilizing effect in the polymerizable materials herein disclosed, but in general, the catechols containing a hydrocarbon group such as a normal aliphatic hydrocarbon group in the 4-position are superior to those containing branched chain hydrocarbon groups in such position. The 4-substituted compounds have minimal effect upon the rate of cure and mixtures containing them are exceptionally constant as to rate of cure.

Naturally, there is some variation as to the value of the several members of the class, but all possess valuable gelation inhibiting characteristics in the compositions comprising the polyesters or copolymerizable mixtures of such polyesters and polymerizable ethylenically unsaturated compounds. Accordingly, they are all regarded as falling within broader concepts of the invention.

The 4-substituted catechols contemplated according to this invention have the following structure:

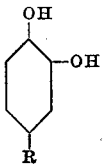

where R is a group consisting wholly of hydrogen and carbon, the number of carbon atoms even when the group contains an aromatic radical rarely exceeding 8 or 10 and they are arranged in a normal or unbranched chain. The following are typical compounds useful according to this invention:

TABLE A 4 methyl catechol
4 ethyl catechol
4 n-propyl catechol
4 n-butyl catechol
4 n-amyl catechol
4 n-hexyl catechol
4 n-heptyl catechol
4 n-octyl catechol Many of these compounds have previously been prepared, though not tested, as gelation inhibitors in ethylenically unsaturated polyesters and mixtures of such esters and ethylenically unsaturated polymerizable monomeric compounds.

Catechols containing a 4-normal alkyl side chain may be purchased on the open market. A general method of preparing such compounds involves the use of 3,4 dimethoxy benzaldehyde as a starting material. An appropriate normal side chain can be added onto the benzyl group through conventional Grignard reaction. By appropriate series of stages, the resultant side chain can be converted to the desired alkyd group. For example, the stages represented by the equations to follow may be conducted and the 3,4 methoxy groups may be converted to hydroxyl (—OH—) groups.

In the equations the preparation of 4-ethyl catechol is represented, CH₃MgBr being employed to add on a CH₃ group to the carbon of the carbonyl. However, it will be apparent to those skilled in the art that methyl magnesium bromide may be replaced by ethyl magnesium bromide, n-propyl magnesium bromide, and the like and the same series of steps followed through to obtain the desired carbon length in the side chain.

Step A

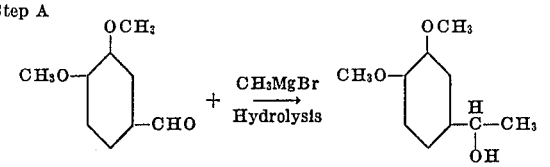

(3,4-dimethoxybenzaldehyde)    (3,4-dimethoxy phenyl α methyl carbinol)

Step B

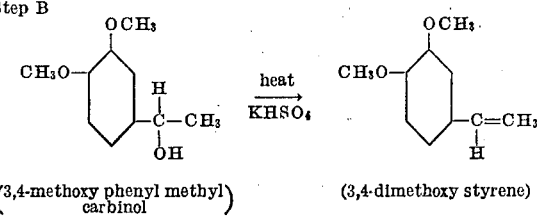

(3,4-methoxy phenyl methyl carbinol)    (3,4-dimethoxy styrene)

Step C

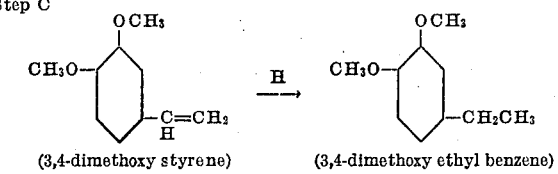

(3,4-dimethoxy styrene)    (3,4-dimethoxy ethyl benzene)

Step D

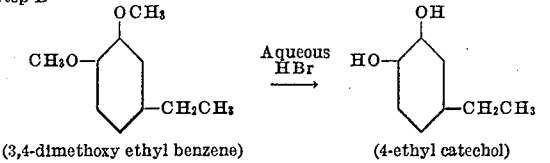

(3,4-dimethoxy ethyl benzene)    (4-ethyl catechol)

Naturally 4-methyl catechol can be obtained by simple hydrogenation of 3,4-dimethoxy benzaldehyde.

The catechols containing a normal alkyl hydrocarbon group in the 4-position are applicable to the stabilization of a relatively broad range of polyesters of dihydric alcohols and α ethylenically unsaturated dicarboxylic acids, or preferably mixtures of such polyesters and ethylenically unsaturated compounds termed monomers.

The preparation of ethylenically unsaturated polyesters which can be stabilized with catechols containing unbranched or normal chains in the 4-position follows conventional procedures and need not be elaborated upon. Essentially it involves an esterification reaction between an ethylenically unsaturated (usually α ethylenically unsaturated) acid or its anhydride and a dihydric alcohol.

The preparation of polyesters of dihydric alcohols and ethylenically unsaturated alpha beta dicarboxylic acids which can be stabilized by 4-substituted catechols containing a normal alkyl group in the 4th position follows conventional procedures. Normally, the dihydric alcohol and the acid or its anhydride, with or without additions of polycarboxylic acids such as dicarboxylic acids having no ethylenic or other forms of reaction unsaturation, or monocarboxylic acids, are reacted with a dihydric alcohol.

Various acids including ethylenic unsaturation and alpha beta dicarboxylic groups may be esterified with dihydric alcohols to provide polyesters and are contemplated as being within the scope of the invention. Representative members of the class are as follows:

TABLE B

Maleic acid
Fumaric acid

Aconitic acid
Mesaconic acid
Citraconic acid
Ethyl maleic acid
Pyrocinchoninic acid
Xeronic acid
Itaconic acid
Carbic acid and others The chlorine substituted derivatives of the acids, e. g., chloromaleic acid, are also contemplated. The anhydrides of these acids where anhydrides exist, of course, are embraced under the term "acid," since the reaction products or polyesters of the anhydrides are the same as those of the acids per se. Often it is preferable to operate with the anhydride rather than the free acid. All of the acids are di- or tricarboxylic. Most of them include an ethylenic group in alpha relation to at least one carboxyl. That is, they include the group:

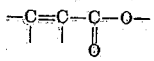

The acid or anhydrides which are alpha beta ethylenic, alpha beta dicarboxylic are especially desirable but the invention is not restricted solely to these.

Dihydric alcohols that can be esterified with any of the foregoing acids comprise the following:

TABLE C

Ethylene glycol
Diethylene glycol
Triethylene glycol
Polyethylene glycol
1,3 trimethylene glycol
1,2 propylene glycol
Dipropylene glycol
Butylene glycol
Styrene glycol Halogen substituted dihydric alcohols, e. g., monochloro derivatives, are within the scope of this invention.

It will be appreciated that the ethylenically unsaturated acids provide double bonds which are capable of reacting by addition with ethylenic compounds often termed monomers, or even with themselves. Usually, an adequate number of points of unsaturation in the polyester molecules can be attained, even though substantial amounts of the ethylenically unsaturated acids are replaced by other dicarboxylic acids which are free of ethylenic unsaturation or other forms of unsaturation which are adapted to react by addition. Obviously in this latter type of acid, the principal functioning groups are the carboxyls that react by esterification. Such acids in the polyester add to the length of the polyester molecules but they do not cross link the molecules at points intermediate therein by addition with other compounds or molecules. Often such ethylenically saturated dicarboxylic acids improve the properties of the resins in which they are introduced. The dicarboxylic acids free of ethylenic unsaturation, of course, are not required in all cases and therefore it is impracticable to set a minimum as to the amount of such acids that may be incorporated with the ethylenically unsaturated alpha beta dicarboxylic acids in forming the esters. A minimum of .25 mole per mole of the ethylenically unsaturated acid is suggested, since it is believed that if the proportion of the acid free of ethylenic unsaturation is reduced much below this point, it will not exert any great effect in the polyester molecule. The proportion of the acid free of ethylenic unsaturation may be increased to 6 or even 8 or 10 moles per mole of the unsaturated acid to provide polyesters which are still capable of cross linking at points of unsaturation.

Examples of appropriate dicarboxylic or tricarboxylic acids which are free of ethylenic and acetylenic unsaturation are tabulated as follows:

TABLE D

1. Phthalic acid
2. Tetrachlorophthalic acid
3. Succinic acid
4. Adipic acid
5. Suberic acid
6. Azelaic acid
7. Sebacic acid
8. Dimethyl succinic acid Chlorinated derivatives of acids 1, and 3 to 8 inclusive of the above list are not precluded. For purposes of the present invention, aromatic nuclei of such acids as phthalic acid are regarded as saturated, since the double bonds do not react by addition of ethylenic groups. The term "acid," as it occurs in Table D, includes the anhydrides of such acids as form anhydrides. Mixtures of any 2 or more of the acids of Table D are contemplated. The proportions of the acids in such mixtures may be equimolar or any other convenient proportion.

It is sometimes desirable to include in the polyester molecule a monobasic acid component such as a free fatty acid of a glyceride oil. Fatty acids of drying oils are especially suitable, since they impart air drying characteristics to the polyester. However, other monobasic acids may also be included. The oil monobasic acids may be employed in amount of about 1 or 2 moles for each 10 or 12 moles of the dicarboxylic acids. Appropriate aliphatic acids for use in the process are represented by the following table:

TABLE E

Linolenic acid
Linoleic acid
Eleostearic acid
Octadecatrienoic acid
Clupanodonic acid
Acetic acid
Propionic acid Mixtures of these acids are contemplated.

Proportions of the several constituents of the polyester may be summarized as follows:

| | |
|---|---|
| Ethylenically unsaturated dicarboxylic acids | 2 to 12 moles. |
| Acids free of ethylenic unsaturation | 2/5 to 144 moles. |
| Drying oil acid or other monocarboxylic acid, optional but if present. | 2 to 12 moles of the other acids. |
| Dihydric alcohol | usually equivalent to or in slight excess of the several acid components of the polyester. However, large excesses or deficiencies of alcohol may be used. |
| Monohydric alcohol such as ethyl, methyl, propyl, butyl, allyl, lauryl, oleyl, benzyl alcohols, etc. | Optional. Amounts rarely exceeding 1 mole of monohydric per mole of dihydric alcohol. |

In the preparation of the polyesters, the alcohols such as those enumerated in Table C are usually employed in approximately molar equivalency or slightly in excess of such equivalency, e. g., 10 or 20% excess of the one or more acid components of the polyester.

The monocarboxylic acid component is merely added to the mixture of dihydric alcohol and dibasic acids and the mixture is heated as previously described.

In conducting the esterification, of the dihydric alcohol and the acid or acids, conventional principles of esterification are adhered to. For example, acid catalysts may be added to promote the reaction. The reaction may also be conducted under an atmosphere of carbon dioxide or nitrogen gas. Xylene or other nonreactive solvent may be included in the reaction mixture. It is refluxed during the course of the reaction, but ultimately it is distilled off.

The temperature of reaction is such that water of esterification is evolved and the reaction is continued until such water ceases to evolve and the acid value of the sample is reduced to a reasonably low figure, e. g. 5 to 50. It should not be continued so long as to result in the formation of an infusible, insoluble polyester. Usually a temperature of 150 to 190 or 200° C. may be attained in the reaction. The reaction can usually be completed within 2 to 20 hours. It should be discontinued before an infusible polyester is formed.

If desired, the monohydric alcohol and/or monobasic acid may be added after reaction of the dihydric alcohol with the dibasic acid after the reaction is partially or wholly complete. In this case heating is continued until a substantial portion of alcohol or acid is reacted and unreacted components are distilled off.

The polyesters are per se capable of polymerization by addition reaction between the double bonds in the molecule. To effect such addition reaction, it is preferable to add a catalyst of addition such as benzoyl peroxide or tertiary butyl hydroperoxide or the like organic peroxide catalyst to the polyester. These catalysts may be added in appropriate amount, e. g., 0.1 to 5% by weight of the polyester. Naturally if the polyesters are to be employed without addition of a polymerizable ethylenically unsaturated compound such as enumerated in Table F, which is to follow, the 4-substituted catechol compound herein contemplated is merely added to the polyester in appropriate amount, e. g., 0.001 to 1 or 2% by weight, based upon the total amount of polymerizable components present. This may be effected by simple addition of the catechol compound to the polyester while it is hot, for example, at a temperature of 100 or 150° C. The inhibitor compound is effective in preventing subsequent gelation of the polyester.

While the polyester, stabilized as herein described may be used alone, it is more common to mix the polyesters with an appropriate ethylenically unsaturated compound.

The styrene or other monomeric ethylenic compound, preferably, is added to the polyester while the latter is hot, e. g., at a temperature of 100 or 120° C., or such other temperature as will effect easy mixing and rapid solution. The stabilizer should be present during the mixing operation. If it is not present, the hot solution will gel prematurely. The stabilizer (4 n-alkyl catechol) may be dissolved either in the polyester component or the vinylic compound, dependent upon which it dissolves in most readily. Naturally peroxide catalyst is not present during the mixing of the polyester and the vinyl compound.

The ethylenic compound employed usually contains one or more of the aliphatically unconjugated polymerizable groups

linked to a negative radical such as a benzene nucleus, halogen, carboxyl radical, C≡N or the like. Such mixtures are much more reactive than the simple polyesters per se. The stabilization of these mixtures, therefore, is more urgent than that of the polyester. Copolymerizable mixtures may comprise any of the polyesters previously referred to. Polyester may be incorporated with vinylically unsaturated monomers such as those referred to in the patents previously mentioned.

The polymerizable ethylenically unsaturated compounds, usually in monomeric form, may comprise any of the common ethylenic compounds capable of copolymerizing with unsaturated polyesters. Preferably such compounds are liquids and, at the temperature of copolymerization are soluble in or compatible with the polyester.

The following include some of the representative ethylenic compounds:

TABLE F

1. Styrene
2. α Methyl styrene
3. p-Methyl styrene
4. Divinyl benzene
5. Indene

Unsaturated esters such as:

6. Vinyl acetate
7. Methyl methacrylate
8. Methyl acrylate
9. Allyl acetate
10. Diallyl phthalate
11. Diallyl succinate
12. Diallyl adipate
13. Diallyl sebacate
14. Diethylene glycol bis (allyl carbonate)
15. Triallyl phosphate
16. Esters such as those of monohydric or polyhydric alcohols (methyl, ethyl, propyl, allyl, methallyl, vinyl) and an unsaturated polymerizable monocarboxylic acid (acrylic, methacrylic, chloroacrylic)
17. Other esters of monohydric unsaturated alcohols (allyl, vinyl, methallyl, 2-chloroallyl, crotyl) and mono- or polycarboxylic acids (acetic, propionic, succinic, etc.)
18. Esters of αβ unsaturated dicarboxylic acids (maleic, fumaric, itaconic) and monohydric alcohols (methyl, ethyl, propyl, isopropyl, amyl)

Many of these compounds, including syrupy mixtures of monomer and polymer may be combined with any of the polyesters prepared from compounds B, C, D and E previously described. Mixtures of any two or more of the foregoing compounds and the polyesters are contemplated.

The compound or monomer containing the group $CH_2=C<$ usually comprises from 10 to 60% upon a weight basis of the copolymerizable mixtures, and mixtures containing 20 to 40 or 50% by weight of the said compound are to be preferred.

To formulate a stabilized or non-gelling mixture of (1) an unsaturated polyester of a dihydric alcohol and an acid comprising a dicarboxylic ethylenically unsaturated acid and (2) a compound containing the group $CH_2=C<$, it is usually preferred to dissolve the catechol containing a normal or unbranched alkyl group in position 4 in all or a portion of the ethylenically unsaturated compound. In case it is added to a portion only of the compound, this portion is added to the polyester component first. The temperature of mixing of the polyester should be sufficiently low to obviate premature polymerization. A temperature of 120° C. or below is usually safe.

The catechol containing a normal alkyl hydrocarbon radical in position 4 may be employed in any appropriate stabilizing amount 0.01 to 2% by weight of the ultimate mixture of polymerizable components.

The mixtures of polyesters and compounds containing the group $CH_2=C<$ can be stored for long periods of time without any substantial tendency to gel. When it is desired to employ the mixtures in the preparation of resins in castings, laminations or the like, a cure may be effected by heating the uncatalyzed mixture sufficiently long at an adequate temperature, or the mixtures may be exposed to irradiation by ultraviolet light. However, it is usually preferable to effect the cure by adding appropriate organic peroxide catalyst and then heating the mixture to polymerization temperature. Appropriate catalysts include benzoyl peroxide, tertiary butyl hydroperoxide, cyclohexyl hydroperoxide, acetyl peroxide, lauroyl peroxide and others. These catalysts may be added in amounts of .01% or even up to 5% by weight. Approximately 1% by weight is usually satisfactory. The peroxide catalyst should be stirred into the copolymerizable mixture in conventional manner. If desired, the catalyst may be diluted with styrene or xylene or other convenient solvent. The catalyst will usually be added at as short a period as practical before it is desired to effect cure of the copolymerizable mixture. However, as previously indicated, it is sometimes necessary to store the catalyzed mixture for several hours or even a day or two before the ultimate curing operation. Sometimes this storage may be at temperatures up to 100° F. or even slightly above. It has previously been pointed out that the mixtures stabilized with the catechols containing a normal alkyl hydrocarbon chain in position 4 as herein disclosed successfully withstand such storage and during such period of storage as well as any previous storage of the mixture in uncatalyzed state, changes as to ultimate curing rate of the mixture are slight, as compared with mixtures stabilized with conventional phenolic compounds.

When it is desired to cure the resins which have been stabilized and catalyzed in accordance with the provisions of the present invention, they are introduced into appropriate molds or applied to a fabric or fibrous base or other appropriate base or filler as in conventional coating or laminating operations. The cure can be effected by moderate heating of the copolymerizable mixture to a temperature of about 75 or 100° C. or below until the mixture has adequately gelled. Gelling may be at relatively low temperatures, e. g., 22° C. or thereabouts, if time is unimportant in the operation. It is preferred to harden the gelled resin by heating it to 125 or 150° C. or thereabouts. High temperatures of initial gelling and curing are permissible, but due care should be observed not to raise the temperatures so high as to volatilize the ethylenically unsaturated compound in the initial cure or to char or discolor the final product. The temperature of gelling and curing, of course, will vary, dependent upon such factors as size, thickness of the body to be formed and the temperature of reaction. Usually a period of 5 minutes to 2 hours is sufficient. However, it is easy to determine by hardness tests or by mere observation when the articles are cured to a hard, clear state.

It will be appreciated that many of the vinylic compounds such as styrene or the like which may be employed in the preparation of copolymerizable mixtures in accordance with the provisions of the present invention, as sold commercially, contain small amounts of inhibitors of gelation, in order to admit of storage and shipment thereof without premature gelation or polymerization. Commonly quinone or hydroquinone is employed for such purpose but others may be included. Such commercial vinylic compounds containing a small amount of stabilizer of conventional type may be employed in the preparation of the mixtures herein disclosed. Usually, the amount of inhibitor so introduced into the mixture is relatively small, since the vinylic compound is only a part of the mixture. Also the amount of inhibitors still present in the vinylic compound may have been substantially depleted during storage before it is admixed with the polyester. Accordingly, this stabilizer introduced through the monomer is not objectionable and the catechols containing a normal aliphatic hydrocarbon group in the position 4 can be added directly thereto. However, if so desired, it can be removed from commercial styrene or similar vinylic compounds by distillation or other appropriate technique.

The proportions of the several components of the copolymerizable mixtures, prior to catalyzation, may be within approximately the following ranges:

Vinylic monomer_____ 10 to 60 parts by weight
Unsaturated polyester_____ 40 to 90 parts by weight
Catechol containing a normal aliphatic hydrocarbon group in position 4_____ 0.001 to 2% by weight of the total mixture.

The uncatalyzed mixture can be stored at room temperature for months without gelation. When these mixtures are to be cured, it is preferred to add an organic peroxide catalyst such as benzoyl peroxide in an amount of about .01 to 5% by weight. The mixtures are still relatively stable at temperatures below about 120° F. When heated to 160° F. and above, they cure readily and form clear, sound products.

For purposes of demonstrating the effectiveness of the catechols containing a normal aliphatic hydrocarbon substituent in the 4-position, a series of tests were conducted in which standard mixtures were prepared and were then stabilized by addition of the 4-substituted catechols.

The copolymerizable mixture employed in the tests was of the following composition: polyester—60 parts by weight. This polyester was of 20 moles or a slight excess thereof of propylene glycol which had been reacted with a mixture or maleic acid and phthalic acid respectively in the proportions of 9 moles and 11 moles. To this polyester was added 25 parts by weight of styrene. The mixture was stabilized with the inhibitors in the amounts hereinafter designated in Table G. The amounts are expressed as percentages by weight based upon the polyester in the mixture.

Before the tests, the stabilized mixtures were admixed with 1.0% by weight of benzoyl peroxide as a standard catalyst. A series of samples were then prepared and the following tests were conducted: (A) a so-called "tank life" test at 100° F. and 77° F. was performed. In this test, the mixture was simply stored at the temperatures indicated and the time for gelation in hours was observed and is recorded in the appended table under the appropriate temperature headings.

Tests to determine rate of cure and the change in the rate of cure with lapse of time was conducted upon the catalyzed mixtures and has been designated in the table under the heading of "LPE" which is a test of the rate of cure. In determining this value, 11 to 12 gram samples of the copolymerizable mixture containing 1.0% by weight of benzoyl peroxide as a polymerization catalyst was introduced into a test tube of 16 millimeters diameter. The depth of solution in such tube was approximately 3 inches. A conventional thermocouple was then introduced at the center of the tube to a depth of about 1 inch from the bottom. The tube with the thermocouple appropriately connected to a recording potentiometer was inserted in a water bath at about 180° F. and the recording apparatus was started. The temperature within the tube increased to that of the bath, but owing to the generation of exothermic heat, continued upwardly to a maximum which has been termed the "peak exotherm." The "LPE" values are recorded as the time in minutes for the mixture to rise from 150° F. to the "peak exotherm" and is an excellent indicator of the rate of cure of the mixture.

In the table, "LPE" values in the first column are recorded for the mixtures immediately upon the addition of the catalysts and are indicated under the heading "0" (zero hours). "LPE" values are also recorded for "24" (hours) and "48" (hours) and the changes from the corresponding readings at zero ("0") hours are an indication of the "drift" in the curing rate of the resins. Of course, it is desirable that this drift be as small as possible. The catechols containing a normal aliphatic hydrocarbon group in the 4-position meet this requirement surprisingly well.

In the table, the columns indicated $^{1}100$ and $^{1}77$ are the data obtained by dividing the "tank life" in hours as recorded under the headings "100° F." and "77° F." respectively by the LPE value at zero hours. The values under the headings $^{1}100$ and $^{1}77$ are indices of the efficiency of the compounds as tank life stabilizers of the copolymerizable mixtures. It is desirable that these values be as high as possible.

The data for the several tests is tabulated as follows:

TABLE G

| Percent Inhibitor Based On Weight Of Polyester | L. P. E. | | | Tank Life, Hours | | $^{1}100$ | $^{1}77$ |
|---|---|---|---|---|---|---|---|
| | 0 | 24 | 48 | 100° F. | 77° F. | | |
| 0.02% 4-propyl catechol | 5.6 | 5.2 | 4.6 | 43 | 192 | 7.7 | 34.3 |
| 0.03% 4-propyl catechol | 6.9 | 6.6 | 6.0 | 56 | 192 | 8.1 | 27.8 |
| 0.04% 4-propyl catechol | 11.0 | 10.0 | 9.1 | 80 | 240 | 7.3 | 21.8 |
| 0.015% 4-methyl catechol | 5.55 | 5.25 | 4.6 | 29 | 156 | 5.2 | 28.2 |
| 0.020% 4-methyl catechol | 6.6 | 6.15 | 5.3 | 33 | 170 | 5.0 | 30.2 |
| 0.025% 4-methyl catechol | 8.2 | 7.4 | 5.9 | 50 | 228 | 6.1 | 30.8 |
| 0.03% 4-n-amyl catechol | 7.15 | 7.0 | 5.8 | 60 | 240 | 8.4 | 33.6 |
| 0.04% 4-n-amyl catechol | 8.9 | 8.3 | 6.45 | 91 | 300 | 10.2 | 33.6 |
| 0.02% 4-isopropyl catechol | 5.7 | 6.4 | 5.5 | 36 | 192 | 6.3 | 33.7 |
| 0.03% 4-isopropyl catechol | 6.8 | 7.9 | 6.7 | 52 | 288 | 7.7 | 42.4 |
| 0.04% 4-isopropyl catechol | 8.65 | 9.4 | 8.15 | 67 | 360 | 7.7 | 41.7 |

The copolymerizable mixtures, such as the one above described, are well adapted for use in the manufacture of castings, laminations and similar bodies. A mixture of ethylenically unsaturated alpha beta dicarboxylic acid polyester and a polymerizable ethylenic compound can be appropriately stabilized with the catechols containing normal alkyl hydrocarbon groups in the 4-position for any reasonable periods of storage before and after the addition of the catalyst. When it is desired to effect a cure of the catalyzed mixtures, the latter can be poured, or otherwise introduced into molds of any convenient design and there subjected to cure by appropriate heating. Sheets of fibrous material can also be impregnated with the copolymerizable mixtures and the sheets can then be cured by passing them between heated rollers or under radiant heaters or other heating devices in order to cure the resins into hard, thermoset state. The copolymerizable mixtures, appropriately catalyzed, can also be applied to surfaces of various types including wood, metal, paper and the like and there subjected to cure by radiant heat or by pressing against heated surfaces.

In further tests, a polyester of propylene glycol and equal moles of maleic acid and phthalic acid was prepared by conventional methods.

To 600 grams of this polyester were added 300 grams of styrene containing 4 n-alkyl catechol in amounts as indicated in the appended table. Such mixtures are stable in normal storage. They have good tank life after catalyst is added and they cure rapidly and efficiently when the catalyzed mixtures are heated to curing range as is evidenced by the data in the aforementioned table.

TABLE H

| Percent Inhibitor Based On Weight Of Polyester | Percent BP | LPE | | | TL | |
|---|---|---|---|---|---|---|
| | | 0 | 24 hr. | 48 hr. | 100° F., hrs. | 77° F., hrs. |
| 0.025% 4-methyl catechol | 1.5 | 5.3 | 3.8 | 3.4 | 32 | 104 |
| 0.025% 4-ethyl catechol | 1.5 | 4.5 | 3.8 | 3.1 | 25 | 91 |
| 0.025% 4-n-propyl catechol | 1.5 | 3.5 | 3.9 | 2.9 | 24 | 86 |
| 0.025% 4-n-butyl catechol | 1.5 | 3.4 | 3.2 | 2.8 | 20 | 72 |
| 0.05% 4-n-propyl catechol | 1.5 | 6.5 | 5.3 | 4.2 | 42 | ---- |
| 0.05% 4-n-butyl catechol | 1.5 | 5.0 | 4.6 | 3.5 | 29 | 102 |

In the table, the heading %BP designates percentages by weight of benzoyl peroxide in the mixture. The remaining headings are the same as those previously used in Table G.

It will also be understood that the invention is applicable to the stabilization of other polymerizable unsaturated alkyd resins including those disclosed in U. S. Letters Patent Nos. 2,443,736 to 2,443,741 inclusive as well as in the others Letters Patent referred to above.

The following examples concretely illustrate the application of the principles of the invention:

Example I

A polyester was prepared from the following mixture:

|  | Moles |
|---|---|
| Maleic acid | 2 |
| Phthalic acid | 3 |
| Propylene glycol | 4.1 |
| Diethylene glycol | 1.4 |

It will be observed that the sum of moles of the two glycols was in slight excess of that of the dicarboxylic acids.

The reaction was of conventional type in the preparation of polyesters. The polyester formed is formulated with the other reactants as follows:

|  | Parts by weight |
|---|---|
| Polyester | 78 |
| Styrene | 22 |
| 4 n-propyl catechol | .012 |

The mixtures so formulated can be stored for long periods of time without gelation. When it is desired to cure them, a catalyst such as benzoyl peroxide in an amount of 1% by weight or thereabouts can be added. It is desirable that the catalyzed mixture remain stabilized until it is actually heated.

Curing ranges from 100 to 350° F. are contemplated. The period of time required will usually be within the range of 5 minutes to 2 hours dependent upon such factors as temperature, hardness desired in the finished product and the size of the article to be formed. The curing reaction is exothermic and in large castings the temperature will rise when reaction is initiated. If the temperature rises unduly, appropriate cooling can be applied.

The use of the invention is not limited to the formation of castings. The stabilized mixtures are very effective for impregnating webs and bats of fibrous materials such as cotton fabric or fabrics of glass fibers and the like. The webs may be impregnated by dipping in a solution or mixture of the polymerizable composition. Likewise it is permissible to coat the surface of a web or sheet with the compositions and then to cure the coating by heat or by irradiation with ultraviolet light. The use of filled compositions, that is compositions containing pulverulent fillers such as wood flour, titanium dioxide, finely divided calcium carbonate and many other materials which are non-reactive with respect to the resin is contemplated.

Example II

In this example, propylene maleate phthalate was prepared by heating:

|  | Moles |
|---|---|
| Maleic anhydride | 3 |
| Phthalic anhydride | 2 |
| Propylene glycol | 5 to 6 |

This polyester free of monomer can be stabilized with a 4-substituted catechol such as 4-propyl catechol as herein disclosed. However, it is usually preferred to admix the polyester with an appropriate monomer or polymerizable ethylenically unsaturated compound such as styrene. In this example, a polyester of 67 parts and styrene of 33 parts were admixed with .013 part of 4-propyl catechol (parts as given by weight). This mixture, like the one described in Example I, can be stored at ordinary atmospheric temperatures for long periods of time. In order to cure the mixture, it can be admixed with 1.7% benzoyl peroxide and heated to curing range.

This catalyzed mixture, like the others described, can be employed for impregnating fibrous bodies or for coating such bodies and when so employed, they can be cured by irradiation or by heating. It can also be cast into and cured in molds by irradiation or by application of heat.

Example III

Propylene maleate phthalate was prepared by reacting:

Maleic acid, 9 moles
Phthalic acid, 11 moles and a 10 to 20% excess of propylene glycol Eighty-four parts by weight of this mixed polyester was admixed with 16 parts by weight of styrene. To stabilize this mixture, add .017 part of 4-propyl catechol. The mixture has good storage properties in the absence of catalysts. To prepare a readily polymerizable mixture, 1% of benzoyl peroxide can be added.

Example IV

In this example a polyester of equal moles of phthalic acid and maleic acid was prepared. The glycol was propylene glycol which was employed in a molar excess of about 10 to 20%. A copolymerizable mixture comprising:

67 parts by weight of polyester
33 parts by weight of styrene

To stabilize this mixture include .013 part by weight of n-amyl catechol. The mixture in the absence of catalyst is storable over long periods of time. To prepare a readily copolymerizable mixture, 1.5% of benzoyl peroxide can be added. The liquid mixture, like those previously described, can be employed for impregnating or coating webs of fibrous materials or admixing with non-reactive fillers. It is also useful in making castings in molds.

Example V

A mixed polyester of:

9 moles maleic acid
11 moles phthalic acid and
10 to 20% excess of propylene glycol is prepared. 6,100 parts by weight of polyester is admixed with 2,400 parts by weight of styrene containing 0.80 part by weight of 4-propyl catechol. This product is stable over many months.

Example VI

In this example, a polyester of the same composition disclosed in Example V is prepared. A polymerizable mixture comprising 1300 parts by weight of polyester, 270 parts by weight of styrene and 0.282 part by weight of 4-n-propyl catechol is formulated.

Example VII

The polyester in this example is the same as that employed in Example V. A copolymerizable mixture of 6000 parts by weight of the polyester is mixed with 3,000 parts by weight of styrene containing 0.89 part by weight of 4-n-propyl catechol. This mixture is stable over long periods of time.

The mixture and the others herein disclosed can be employed for coating and impregnating sheets and webs of fibrous or other materials. It is also receptive to non-reactive fillers such as wood flour and the others herein described.

Example VIII

A polyester which was of the same composition as that employed in Example V is prepared. A copolymerizable mixture comprising 60 parts by weight of polyester, 25 parts by weight of styrene and .009 part by weight of 4-methyl catechol is prepared.

Example IX

Substitute .018 part by weight of 4-n-amyl catechol for 4-methyl catechol in Example VIII to produce a stable composition.

In the several examples, benzoyl peroxide has been designated as a catalyst. Obviously other of the common peroxide type catalysts can be employed in a like capacity. These include tertiary butyl peroxide, tertiary butyl hydroperoxide, lauroyl peroxide and many others familiar to the art. In some cases, as for example where the polymerizable mixtures can be irradiated with ultraviolet light, catalysts can be dispensed with.

Although the present invention has been described with particular reference to the specific details of certain embodiments thereof, it is not intended that such details shall be regarded as a limitation upon the scope of the

I claim:

1. As a new composition of matter, a polymerizable mixture of (A) a polyester of a dihydric alcohol and an α ethylenically unsaturated dicarboxylic acid and (B) a small stabilizing amount of 4-n-butyl catechol.

2. As a new composition of matter, a copolymerizable mixture of (A) an ethylenically unsaturated monomeric compound and (B) a polyester of a dihydric alcohol and an α ethylenically unsaturated dicarboxylic acid and (C) 4-n-butyl catechol.

3. As a new composition of matter, a polymerizable mixture of (A) a polyester of a dihydric alcohol and an α ethylenically unsaturated dicarboxylic acid, (B) a peroxide polymerization catalyst and a small stabilizing amount of (C) 4-n-butyl catechol.

4. As a new composition of matter a copolymerizable mixture of (A) a polymerizable ethylenically unsaturated compound containing the group $H_2C=C=$, (B) a polyester of an α ethylenically unsaturated dicarboxylic acid and a dihydric alcohol and (C) a peroxide polymerization catalyst and (D) a small stabilizing amount of 4-n-butyl catechol.

5. A composition of matter as defined in claim 4, in which the polyester further includes a substantial amount of a dicarboxylic acid free of aliphatic ethylenic unsaturation.

6. In a method of forming resinous bodies of polyesters of a dihydric alcohol and an α ethylenic dicarboxylic acid, the step of incorporating into said polyester a peroxide polymerization catalyst and a small stabilizing amount of 4-n-butyl catechol.

7. In a method of forming a resinous body from a copolymerizable mixture of (A) an ethylenically unsaturated polymerizable monomer and (B) a polyester of a dihydric alcohol and α ethylenically unsaturated dicarboxylic acid, the step of including in said mixture a small stabilizing amount of 4-n-butyl catechol.

8. In a method of preparing thermoset resinous products, the steps of forming a mixture of a polyester of dihydric alcohol and an α ethylenically unsaturated dicarboxylic acid, an ethylenically unsaturated compound conjointly polymerizable therewith, a peroxide catalyst of addition polymerization and a small stabilizing amount of 4-n-butyl catechol.

9. The steps as defined in claim 8 in which the polyester includes 0.25 to 10 mols per mol of the α ethylenically unsaturated dicarboxylic acid of a dicarboxylic acid containing no unsaturation reactive by addition.

10. A copolymerizable mixture of (A) 40 to 90 parts by weight of a polyester of a dihydric alcohol and an α ethylenically unsaturated dicarboxylic acid, (B) 10 to 60 parts by weight of an ethylenically unsaturated compound copolymerizable with said polyester to form a hard resin and (C) a stabilizing amount of 4-n-butyl catechol.

11. A copolymerizable mixture as defined in claim 10 which further contains a small catalytic amount of a peroxide polymerization catalyst.

12. A copolymerizable mixture as defined in claim 10 in which the polyester is a mixed ester containing an effective amount of dicarboxylic acid which is free of aliphatic ethylenic unsaturation.

References Cited in the file of this patent

UNITED STATES PATENTS

| Number | Name | Date |
|---|---|---|
| 2,498,621 | Kropa et al. | Feb. 21, 1950 |